(12) United States Patent
Bullock

(10) Patent No.: US 6,829,914 B2
(45) Date of Patent: Dec. 14, 2004

(54) LOCKING DEVICE WITH NOVEL OPPOSED HOOK PAIRS

(76) Inventor: Terry Bullock, 5853 Kinder Dr., Jackson, MS (US) 39211

( * ) Notice: Subject to any disclaimer, the term of this patent is extended or adjusted under 35 U.S.C. 154(b) by 0 days.

(21) Appl. No.: 10/414,587

(22) Filed: Apr. 16, 2003

(65) Prior Publication Data

US 2004/0206137 A1 Oct. 21, 2004

(51) Int. Cl.[7] ........................ B60R 25/00; E05B 71/00
(52) U.S. Cl. ............................ 70/14; 70/203; 70/212; 70/233; 70/238
(58) Field of Search ................ 70/14, 202, 203, 70/233, 209, 211, 212, 225, 226, 237, 238

(56) References Cited

U.S. PATENT DOCUMENTS

| | | | | | |
|---|---|---|---|---|---|
| 5,347,835 | A | * | 9/1994 | Dewey | 70/202 |
| 5,701,771 | A | * | 12/1997 | Bailey | 70/233 |
| 5,713,539 | A | * | 2/1998 | Russ et al. | 244/224 |
| 5,887,464 | A | * | 3/1999 | Perez | 70/209 |
| 5,911,391 | A | * | 6/1999 | Russ et al. | 244/224 |
| 5,953,941 | A | * | 9/1999 | Freund | 70/199 |
| 6,173,590 | B1 | * | 1/2001 | Witchey | 70/14 |
| 6,679,089 | B2 | * | 1/2004 | Moreton | 70/209 |
| 2002/0104342 | A1 | * | 8/2002 | Witchey | 70/209 |
| 2003/0074934 | A1 | * | 4/2003 | Moreton | 70/209 |
| 2003/0121298 | A1 | * | 7/2003 | Hancock et al. | 70/203 |

* cited by examiner

*Primary Examiner*—Lloyd A. Gall
(74) *Attorney, Agent, or Firm*—Charles F. Rye; Brian K. Shelton

(57) ABSTRACT

A locking device for inhibiting the movement of control arm of a machine relative to a second arm having a tubular main shaft body connected to a first hook base plate, a telescopic shaft body with a diameter adapted to be inserted into the main shaft body and connected to a second hook base plate, a pair of hooks connected to each of the first and second base plates at the ends of the plates and oriented substantially parallel to the shaft bodies and further oriented such that each member of the hook pair opposes the other member by substantially one hundred and eighty degrees. Various applications for the device are disclosed, as well as method for securing an all-terrain vehicle (ATV) with the device.

8 Claims, 2 Drawing Sheets

LOCKING DEVICE WITH NOVEL OPPOSED HOOK PAIRS

BACKGROUND OF THE INVENTION

1. Field of the Invention

The present invention relates generally to security locks, and more particularly to a security lock for inhibiting the movement of an arm of a machine relative to a second arm of the machine to prevent unauthorized use and/or theft thereof.

2. Background of the Invention

The known prior art is replete with security locks for use as anti-theft devices and to prevent unauthorized use of road vehicles, aircraft and various other types of machinery. Numerous forms of automobile security devices exist which prevent operation of the vehicle by various methods. One such form is exemplified by Zaidener, U.S. Pat No. 3,245,239 and Farrow, U.S. Pat. No. 4,779,435, which disclose a locking device which fits over the steering wheel and hooks to the brake pedal. Another form is exemplified by Cummins, U.S. Pat. No. 5,381,769, in which a tubular member is engaged to the rim of a steering wheel to inhibit rotation.

Similar devices exist for aircraft, as disclosed by Russ et al., U.S. Pat. No. 5,713,539, in which a telescoping rod connected to a pair of retaining members attaches to the control yoke and rudder pedals to thereby prevent operation.

Also, locking devices exist for various types of machinery. One such device is disclosed by Witchey, U.S. Pat. No. 6,173,590, for use with a Bobcat™-type vehicle, which attaches at each end of the driver's cage in order to prevent unauthorized use.

Additionally, locking devices exist for vehicles having handlebars, such as motorcycles, wave runners and jet skis. Bailey, U.S. Pat. No. 5,701,771, exemplifies one such device, wherein a pair of tubular members is placed over the ends of the handlebar and the pair of tubular members are connected by a telescoping rod to prevent operation of the vehicle.

All-terrain vehicles, or ATV's, represent a further application for security locks. One type of security device for use with ATV's involves securing the ATV to a fixed point, such as a trailer. Another type of device, as exemplified by Thering, U.S. Pat. No. 5,724,839, discloses a device which attaches to the rims of the wheels of the ATV, thus preventing operation. Still another type of device is exemplified by Dewey, U.S. patent application Ser. No. 830,068, wherein a pair of clamps are placed over the handlebar and the control level and joined in such a manner as to prevent the use of the control lever.

The device of the present invention is distinguishable from the prior art in that the present invention incorporates two pairs of hooks, wherein the first hook in each of the pair of hooks is opposed to the second hook by one hundred and eighty degrees and further, the opening of the first hook is oriented upward and the opening of the second hook is oriented downward. Additionally, the telescopic length of the device of the present invention, as well as the axial alignment along the longitudinal axis of the shafts, may be changed in order to engage arms of a machine of varying distance and axial alignments. These features allow for the device of the present invention to be used in a variety of applications where prior inventions could not. Notably, prior inventions are largely constrained by a design which engages two fixed points on a machine wherein the fixed points are substantially in the same axial alignment relative to each other.

Further, with respect to all-terrain vehicles, the device of the present invention further allows for a method of securing an ATV by engaging the handlebars with one of the pair of hooks and engaging a fixed point on the ATV, such as a luggage rack or similar point, with the second pair of hooks.

None of the above inventions and patents, taken either singularly or in combination, is seen to describe the present invention as claimed. Thus a locking device and method solving the aforementioned problems is desired.

SUMMARY

It is therefore an object of the present invention to provide a locking device that solves the above noted disadvantages.

Accordingly, it is a principal object of the invention to provide a locking device that will inhibit the movement of a control arm of a machine relative to a second arm thereby deterring theft and preventing unauthorized operation.

Another object of this invention is to provide a locking device wherein each of two arms of the machine are engaged by each pair of opposed hooks on the ends of the main shaft body and telescopic shaft body and the device may be rotated to engage arms with distinct axial alignments relative to one another.

Yet another object of this invention is to provide an anti theft device to secure an all-terrain vehicle (ATV) by preventing operation of the handlebar when the device is attached to the handlebar and a section of the ATV frame or attached structure.

A further object of this invention is to provide a method of securing an all-terrain vehicle (ATV) by engaging the handlebars with one of the pair of hooks and engaging a fixed point on the ATV, such as a luggage rack or similar point, with the second pair of hooks.

Still a further object of the present invention is to provide an anti-theft device to secure a vehicle by preventing operation of a control wheel, which may be a steering wheel, when the device is attached to the control wheel and a brake or clutch lever.

Another still further object of this invention is to provide an anti-theft device to prevent unauthorized use of a machine by preventing operation of a control when the device is attached to a control lever of the machine moved to an extreme position and to another control lever, wherein the extreme position may be either with the two control levers in positions where they are closest to each other or furthest away.

These and other objects of this invention are accomplished generally speaking by a locking device which inhibits movement of an arm relative to a second arm. Thus, this locking device can be universally used in applications where one arm of a machine is operated relative to another arm on the same machine. A critical feature of the invention is that two sets of hook pairs positioned at the end of each shaft body are oriented such that the openings of the hooks are substantially one hundred and eighty degrees relative to the other hook in the pair, wherein the opening of the first hook in each hook pair is oriented towards the top edge of a hook base plate and the opening of the second hook is oriented towards to bottom edge of the hook base plate. Another critical feature of the invention is that the opening of the first hook of the first hook pair is substantially one hundred and eighty degrees relative to the opening of the first hook of the second hook pair and the opening of the second hook of the first hook pair is substantiality one hundred and eighty degrees relative to the opening of the second hook of the second hook pair thereby preventing the locking device from being removed from the control arms of a machine when the locking device operatively engages the control arms and a lock is operatively installed on the locking device. Yet another critical feature of the invention is the plurality of opposed apertures in the main shaft body and telescoping shaft body, which allow for numerous distance, axial, and radial locking situations.

BRIEF DESCRIPTION OF THE DRAWINGS

These and other features, aspects, and advantages of the present invention will become better understood with regard to the following description, appended claims, and accompanying drawings, where:

DETAILED DESCRIPTION

Figure 1:
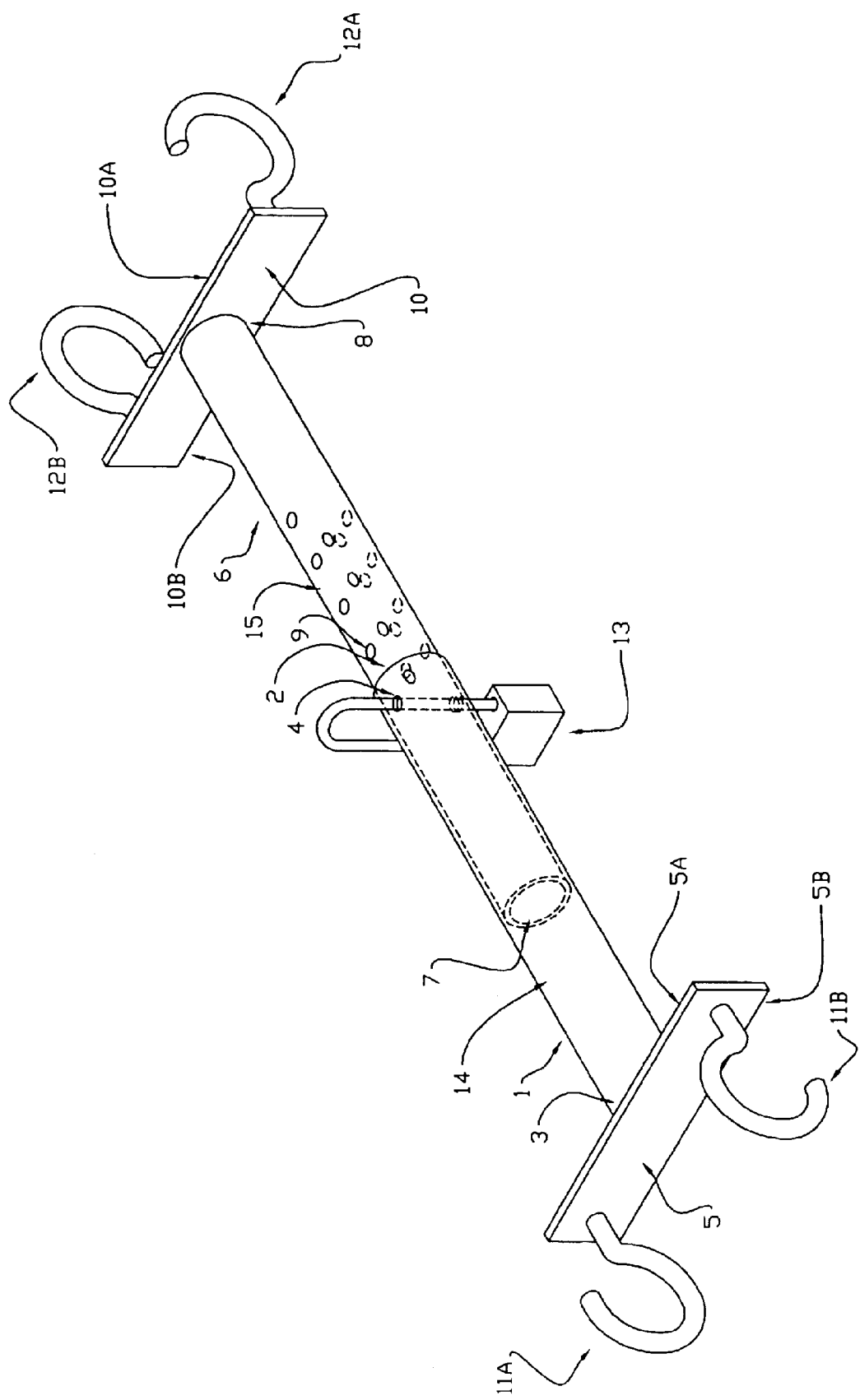
FIG. 1 is an isometric view of a locking device constructed in accordance with the present invention.

In general the illustrated embodiment of FIG. 1 of a locking device essentially comprises a main shaft body 1, a telescopic shaft body 6, a first hook base plate 5 rigidly connected to the main shaft body 1, a second hook base plate 10 rigidly connected to the telescopic shaft body 6, a first pair of hooks 11A and 11B rigidly connected to the opposite ends of the first hook base plate 5, a second pair of hooks 12A and 12B rigidly connected to the opposite ends of the second hook base plate 10, and a lock 13 operatively installed through the main shaft body 1 and the telescopic shaft body 6.

The main shaft body 1 comprises a tubular member 14 having a round cross section, preferably made of hardened steel, with a first end 2 and an opposite second end 3. Two opposing apertures 4 are machined in the main shaft body 1 in a position substantially proximate to the first end 2. It is understood a plurality of opposing apertures can be machined in the main shaft body 1 in various alignments to further provide for additional locking conditions.

A first hook base plate 5 is rigidly connected to the second end 3 of the tubular member 14 in such manner as the hook base plate 5 is substantially perpendicular to the longitudinal axis of the tubular member 14 and further being connected substantially at the midpoint of said hook base plate 5 and centered over the second end 3.

A first pair of hooks 11A and 11B are rigidly connected to the outer face of the first hook base plate 5, wherein the said pair of hooks 11A and 11B are each positioned at opposing ends the said hook base plate 5 and further, that the orientation of said pair of hooks 11A and 11B are substantially parallel to the longitudinal axis of the main shaft body 1 and the first hook 11A is connected such that the opening of said first hook 11A is substantially one hundred and eighty degrees relative to the opening of the second hook 11B, and further, the opening of the first hook 11A is oriented towards the top edge 5A of said hook base plate 5 and the opening of the second hook 11B is oriented towards the bottom edge 5B of said hook base plate 5.

The telescopic shaft body 6 comprises a tubular member 15 having a round cross section, preferably made of hardened steel, with a first end 7 and an opposite second end 8. The diameter of the tubular member 15 is adapted for insertion inside the main shaft body 1, and a series of aligned opposing apertures 9 are machined in the telescopic shaft body 6, the location of the said opposing apertures 9 chosen to facilitate alignment with the opposing apertures 4 of the main shaft body 1 for a plurality of distance, axial and radial rotation locking situations.

A second hook base plate 10 is rigidly connected to the second end 8 of the tubular member 15 in such manner as the second hook base plate 10 is substantially perpendicular to the longitudinal axis of the tubular member 15 and further being connected substantially at the midpoint of said hook base plate 10 and centered over the second end 8.

A second pair of hooks 12A and 12B are rigidly connected to the outer face of the second hook base plate 10, wherein the said pair of hooks 12A and 12B are each positioned at opposing ends the said hook base plate 10 and further, that the orientation of said pair of hooks 12A and 12B is substantially parallel to the longitudinal axis of the telescopic shaft body 6 and the first hook 12A is connected such that the opening of said hook 12A is substantially one hundred and eighty degrees relative to the opening of the second hook 12B, and further, the opening of the first hook 12A is oriented towards the top edge 10A of said hook base plate 10 and the opening of the second hook 12B is oriented towards the bottom edge 10B of said hook base plate 10. The orientation of the hooks are further given as the opening of the first hook 11A of the first hook pair is substantially one hundred and eighty degrees relative to the opening of the second hook 12B of the second hook pair and the opening of the second hook 11B of the first hook pair is substantially one hundred and eighty degrees relative to the opening of the first hook 12A of the second hook pair.

With the telescopic shaft body 6 inserted into the main shaft body 1 as shown in FIG. 1, the locking device is operated by adjusting the length by extending or contracting the telescopic shaft body 6 and further by axially rotating relative to the main shaft body in order to engage a first control arm by the first pair of hooks 11A and 11B and a second control arm by the second pair of hooks 12A and 12B. The length and axial rotation is then further adjusted in order to align the apertures 4 of the main shaft body 1 with a pair of the apertures 9 of the telescopic shaft body 6. A lock 13, which may be a padlock or combination lock of sufficient size, is operatively installed through the apertures 4 and 9 to thereby prevent movement of the first arm relative to the second arm.

Figure 2:
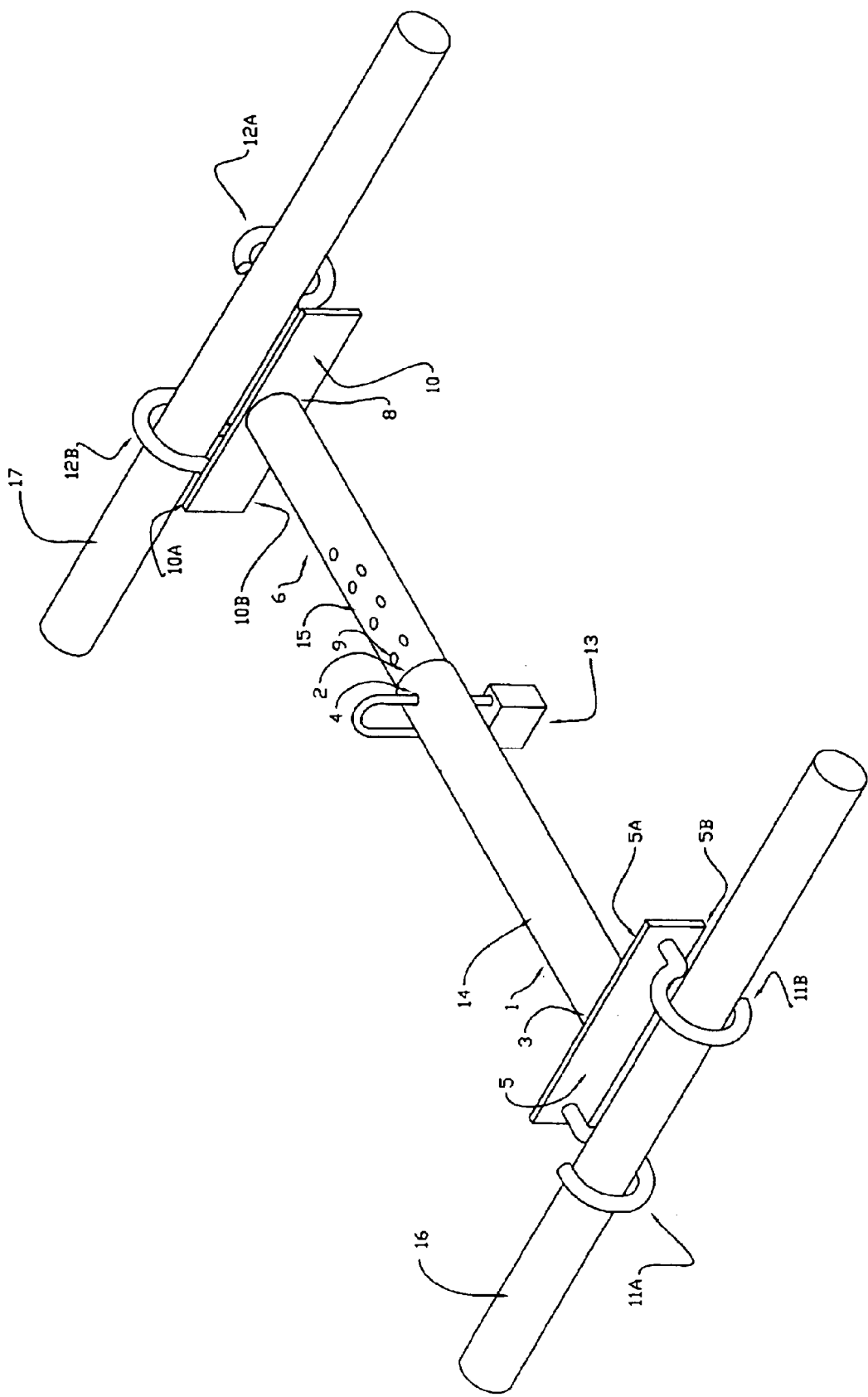
FIG. 2 is an isometric view showing a locking device engaged to two arms of a machine.

Turning to FIG. 2, an embodiment of a locking is shown wherein a partial segment of a first control arm of a machine 16 is operatively engaged by a first pair of hooks 11A and 11B and a partial segment of a second control arm 17 is operatively engaged by a second pair of hooks 12A and 12B. With a lock 13 operatively installed through apes 4 in the main shaft body 1 and apertures 9 of the telescopic shaft body 6 linear and axial translation of the locking device is prevented, thereby resulting in inhibit movement of the first control arm 16 relative to the second control arm 17.

Operation

By way of illustration, and not intended as limitation, the operation of the present invention for various applications is described below. Initially, it is noted that the preferred mode of operation is stated as a locking device for inhibiting the movement of an arm of a machine relative to a second arm by engaging the first arm with a first pair of opposed hooks 11A and 11B, extending and axially rotating the telescopic shaft body 6 relative to the main shaft body 1 in order to engage a second arm with a second pair of hooks 12A and 12B, further adjusting the length and axial alignment of the telescopic shaft body 6 such that the apertures 4 of the main shaft body 1 are aligned with one of the set of aperture pairs 9 of the telescapic shaft body 6, and operatively installing a lock 13 through the apertures 4 and 9 thereby preventing any movement of the first arm toward or away from the second arm and thus securing the machine.

More specifically, the first arm may be a control wheel of a vehicle and the second arm may be a brake or clutch lever. Also, the first arm may be a control lever of a machine moved to an extreme position and the second arm may be another control lever of the same machine which moves in a different plane and is also moved to an extreme position, which may be either a position closest to or furthest away from the first control lever. It is noted in such an application that unauthorized use of the machine with the device installed as described would present the potential of the machine being uncontrollable and thereby potentially hazardous if one were to attempt such an unauthorized use. Accordingly, the device should only be used in conjunction with a positive method to prevent power being applied to the machine or started A further application involves the first arm being a handlebar of an all-terrain vehicle and the second arm is a section of the ATV's frame of attached structure, whereby with the device operatively installed movement of the handlebars would be prevented. The previous application also discloses a method for securing an ATV.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking device for inhibiting movement of an arm relative to a second arm comprising:
   a) a tubular main shaft body having a longitudinal axis, a first end, an opposite second end and a round cross section, with two opposing apertures near the first end;
   b) a first hook base plate oriented substantially perpendicular to the longitudinal axis of the main shaft body and rigidly connected to the opposite end and centered over said end of said main shaft body;
   c) a tubular telescopic shaft body having a longitudinal axis, a first end, an opposite second end, a round cross-section, a diameter adapted for insertion into the first end of the main shaft body having a plurality of aligned opposing pair apertures;
   d) a second hook base plate oriented substantially perpendicular to the longitudinal axis of the telescopic shaft body and rigidly connected to the opposite end and centered over said end of said telescopic shaft body;
   e) a first pair of hooks, said pair of hooks positioned at the opposite ends of the outer face of the first hook base plate, said hooks rigidly connected to said first hook base plate in such manner as the said pair of hooks are substantially parallel to the longitudinal axis of the main shaft body and further oriented such that the openings of said hooks are substantially one hundred and eighty degrees from each other, wherein the opening of the first hook is oriented towards to the top edge of the hook base plate and the opening of the second hook is oriented towards to the bottom edge of the hook base plate;
   f) a second pair of hooks, said pair of hooks positioned at the opposite ends of the outer face of the second hook base plate, said pair of hooks rigidly connected to said second hook base plate in such manner as the said pair of hooks are substantially parallel to the longitudinal axis of the telescopic shaft body and further oriented such that the openings of said hooks are substantially one hundred and eighty degrees from each other, wherein the opening of the first hook is oriented towards to the top edge of the hook base plate and the opening of the second hook is oriented towards the bottom edge of the hook base plate;
   g) whereby the opening of the first hook of the first hook pair is substantially one hundred and eighty degrees relative to the opening of the first hook of the second hook pair and the opening of the second hook of the first hook pair is substantially one hundred and eighty degrees relative to the opening of the second hook of the second hook pair;
   h) whereby the hooks of each end of the device are interchangeably adapted to extend on two sides of said arm and said second arm;
   i) whereby the said main shaft and said telescopic shaft are rotated to engage said hooks on said arm and said second arm;
   j) whereby apertures of both shafts align to receive a locking device therethrough to prevent rotation or any telescoping movement of the shafts; and
   k) thereby preventing any movement of the arm toward or away from the second arm.

2. A locking device as set forth in claim 1, wherein the main shaft body is further comprised of a plurality of aligned opposing pair apertures.

3. A locking device as set forth in claim 1, wherein the arm is a handlebar of an all-terrain vehicle (ATV) and the second arm is a section of the all-terrain vehicle's frame or attached structure.

4. A locking device as set forth in claim 1, wherein the arm is a control wheel of a vehicle and the second arm is a brake or clutch lever.

5. A locking device as set forth in claim 1, wherein the arm is a control level of a machine moved to an extreme position and the second arm is another control lever of the same machine which moves in a different plane also moved to an extreme position.

6. A locking device as set forth in claim 1, wherein the hooks and base plates are unitary.

7. A locking device as set forth in claim 1, wherein the locking device is a key padlock or combination lock.

8. A method for securing an all-terrain vehicle comprising the steps of:
   a) providing a first pair of hooks rigidly connected to a first hook base plate which is further connected to a main shaft body and spaced apart in a parallel relationship with one another and further being oriented substantially one hundred and eighty degrees relative to each other;
   b) providing a second pair of hooks rigidly connected to a second base plate with is further connected to a telescopic shaft body and spaced apart in a parallel relationship with one another and further being oriented substantially one hundred and eighty degrees relative to each other;
   c) engaging the first pair of hooks around the handlebar of the ATV;
   d) engaging the second pair of hooks around the frame or attached structure of the ATV; and
   e) rigidly interlocking the main shaft body with the telescopic shaft body in a selected position wherein the operation of the handlebar of the ATV is prevented.

* * * * *